Feb. 21, 1933.　　　C. W. HANSELL　　　1,898,181
OSCILLATION GENERATION
Filed March 23, 1928
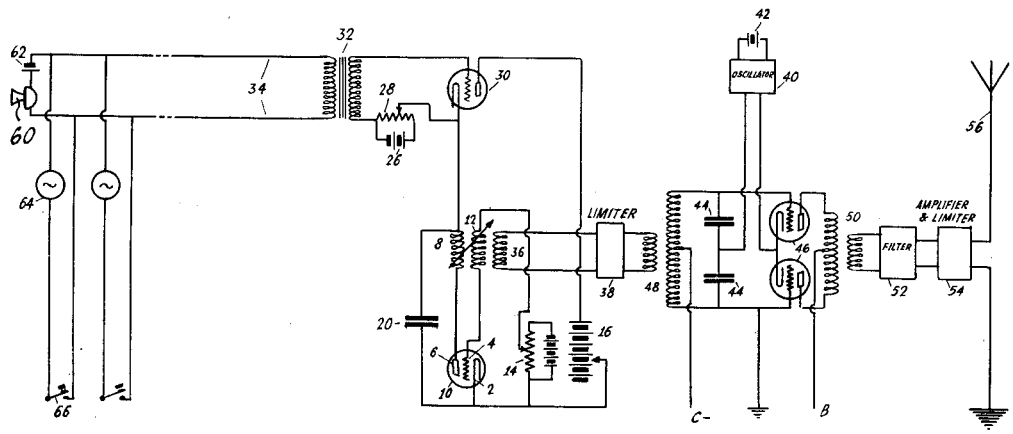
INVENTOR
CLARENCE W. HANSELL
BY
ATTORNEY Patented Feb. 21, 1933

1,898,181

UNITED STATES PATENT OFFICE

CLARENCE W. HANSELL, OF ROCKY POINT, NEW YORK, ASSIGNOR TO RADIO CORPORATION OF AMERICA, A CORPORATION OF DELAWARE

OSCILLATION GENERATION

Application filed March 23, 1928. Serial No. 264,103.

This invention relates to the generation of oscillations, and more particularly to the generation of frequency modulated oscillations.

With a view to reducing fading, narrowing the necessary frequency spectrum of each communication channel, constantly transmitting maximum energy, and for multiplexing, it has been suggested to frequency modulate a constant energy carrier, rather than to amplitude modulate a constant frequency carrier.

The usual type of oscillation generator has its frequency determined by the natural resonant frequency of a tuned circuit. This arrangement is disadvantageous when it is desired to frequency modulate, owing to the structural difficulty of providing a resonant circuit the tuning of which may be both rapidly and linearly varied in response to the control current.

It is an object of my invention to provide a method and means for the generation of oscillations at a frequency which is independent of resonance. I measure the period of oscillation by the time needed for a direct current to charge a condenser. The oscillation is set up by using the charge on the condenser to trip a valve arranged to short circuit and discharge the condenser. When the valve is tripped it is almost immediately reset so that charging of the condenser begins anew. For this purpose I employ an electron discharge valve having control electrode and anode circuits, and a transformer arranged in series with the valve for so mutually coupling the circuits as to tend to make the valve conductive with growing electron discharge and non-conductive with decaying electron discharge. The condenser is connected in parallel with the series combination of the valve and the transformer, and the source of relatively steady charging current is connected to the parallel combination. The direct current is fed to the condenser until it becomes charged, when the increased potential makes the valve conductive to discharge the condenser, and the discharge, by reason of the transformer coupling to the control electrode, makes the valve more conductive to discharge the condenser and then non-conductive to permit the steady current to again charge the condenser, these operations taking place in cyclic succession.

It is a further object of my invention to arrange for frequency control, independently of resonance, which I do by controlling the rate of feed of the charging current which serves to charge the condenser. For frequency modulation, where the frequency is to be varied in response to a modulating current, the modulating means comprises any suitable device for varying the charging current in response to the modulating current. This may take the simple form of a three electrode tube connected in series with the charging current supply, and having its impedance varied in accordance with the modulating current by applying the latter through a transformer to the control electrode of the tube.

The arrangement as so far described is satisfactory in its production of frequency modulated energy, except that there is introduced a certain amount of energy modulation, for the energy per cycle is fixed, being dependent upon the magnitude of the condenser charge, and therefore the power varies with the frequency, the wave form not being sinusoidal. To eliminate this energy modulation is a further object of my invention, which I do by inserting a limiting device in series with the output from the oscillation generator. The limiter consists of an electron emission tube amplifier arranged to saturate at an energy value not higher than the low energy level of the generator output. Instead of a separate limiter an amplifier normally used with the circuit may be operated as a limiter.

One of the advantages of using frequency modulation is the possibility of reducing the necessary frequency band for each transmitter, but when using a small frequency variation in a high frequency carrier the percentage variation may become so small as to present modulating and demodulating difficulties at the transmitter and receiver. Also, with small frequency variations for the signal it becomes especially important to keep the mean frequency constant. This entire problem may be considered from a different aspect, for it is conceded that the mean frequency from the arrangement so far described cannot be kept as constant as modern requirements dictate, and it is desirable to insure constant mean frequency by employing a high frequency oscillator equipped with a crystal drive. Accordingly, my invention includes using frequency modulated energy of intermediate frequency to modulate the output from a constant frequency oscillator. The lower the mean frequency of the frequency modulated energy is made, the less will the mean frequency of the transmitted energy depend thereon, or vary therewith, and it is therefore desirable to use a low intermediate frequency, even though this necessitates a relatively large percentage frequency variation in the energy of intermediate frequency.

The invention is described more in detail in the following specification, which is accompanied by a drawing showing a wiring diagram for a preferred form of my invention.

Referring to the drawing there is an electron discharge valve 10, having a cathode 2, a control electrode 4, and an anode 6. The anode 6 is connected in series with a transformer coil 8. This is adjustably coupled to a coil 12 which is in series with the control electrode 4, an adjustable C battery circuit 14, and the cathode 2. A condenser 20 is connected in parallel with the series combination comprising the valve 10 and the transformer coil 8. A source of direct current 16 is arranged in circuit with the parallel combination of the condenser 20 with the coil 8 and valve 10. The potential and capacitance values are so adjusted that the valve 10 is non-conductive when the condenser 20 is discharged, but becomes conductive upon the condenser 20 accumulating a charge from the source 16.

When current begins to flow through the valve 10 the regenerative coupling causes the control electrode 4 to swing positive, making the valve more conductive, and causing a rapid discharge of the condenser. As soon as the approaching discharge makes itself felt by a decay in the rate of flow of current through the coil 8 the magnetic coupling between the coils 8 and 12 induces a potential in the opposite direction, and causes the control electrode 4 to swing negative, thereby making the valve 10 non-conductive. The regeneration thus tends to make the valve 10 trip completely open or completely closed, and without its use the parallel combination of valve and condenser is apt to assume a steady state of flow, rather than to generate oscillations.

Some induction is desirable in order to obtain a more favorable wave form, or from another view point, it is desirable in order to help complete the discharge from the condenser, for otherwise discharge would cease the moment the rate of discharge begins to decrease, and consequently the condenser would be only partially discharged. The inductance of the primary 8 of the transformer does not aid much because the secondary 12 tends to neutralize its effect. However, the secondary or control electrode inductance does tend to keep the control electrode positive so long as there is a current flow in the control electrode circuit. As a result two conditions must be complied with before the valve trips to cut-off, first, the condenser discharge must begin to decay, so that the regeneration tends to make the control electrode negative, and second, the control electrode current must decrease. Inasmuch as the latter effect takes place somewhat later than the former a delay is introduced which permits of more complete condenser discharge, and improved wave form.

It is clear that the frequency of oscillation is independent of resonance, for there is no oscillatory circuit resonant to the working frequency. Preferably the inductance 8 is much too small to resonate with the condenser 20 in the range of frequencies involved. Furthermore, the circuit including the inductance 8 and the condenser 20 is not an efficient circuit, for it includes in series the high internal resistance of the valve 10. The frequency depends upon the rate of flow of current from the source 16 to the condenser 20, for it is only upon the condenser 20 accumulating sufficient charge that the valve 10 is tripped open and again closed. Accordingly, the frequency is governed by the magnitude of the charging current, and this current magnitude may be varied by a suitable impedance, preferably an electron emission tube 30. The value of the direct current may be adjusted by providing an appropriate potential on the control electrode of the tube 30, which may be done by means of a C battery 26 and potentiometer resistance 28.

In case frequency wobbling or modulation is to be employed in accordance with modulating energy the latter may be applied to the control electrode of the tube 30 through a transformer 32 connected to the control electrode circuit and to a control line 34, or by other satisfactory coupling means. Speech modulation may be provided by a microphone 60 in series with a direct current source 62, and code communication may be provided by controlling a relatively low frequency alternating current from an alternator 64 with keying means 66. For multiplex operation a number of low frequency channels with separate keying means may be provided each having its own characteristic frequency, as is more fully disclosed in my copending application Serial Number 212,192, filed August 11, 1927.

The output from the oscillation generator may be collected in a coil 36, coupled to either or both of the coils 8 and 12, and to then eliminate energy modulation, may be sent through a limiter 38. If desired, the frequency modulated energy may be used to single side band modulate energy of higher frequency, and this is indicated by the arrangement shown, in which high frequency carrier energy is generated in an oscillator 40, preferably crystal controlled by means of a crystal drive 42, and fed cophasially through radio frequency condensers 44 to the control electrodes of the tubes 46. The frequency wobbled energy is supplied to the control electrodes of the tubes in phase opposition through a transformer 48. The energy of carrier frequency is neutralized in the two halves of the output transformer 50, and the side bands are fed to a filter 52, which may be arranged with cut-off frequency about at the carrier frequency, so that only one of the two side bands is fed to a power amplifier 54, the output from which may be radiated by any suitable antenna system 56. To insure constant energy output the power amplifier 54 may itself be made to act as a limiter, by increasing the amplitude of the excitation on each stage beyond the point where an increase in excitation causes appreciable increase in output. This incidentally is the adjustment which is desirable to secure high energy efficiency in an amplifier which is to be operated at constant output or with keyed modulation.

I claim:

1. The method of generating oscillations with an electron emission valve having a control grid and a condenser, which includes relatively steadily feeding current unidirectionally to the condenser, utilizing a resulting charge on the condenser to make the valve conductive to discharge the condenser, and utilizing a discharge of the condenser to apply a biasing potential to said control grid to make the valve non-conductive to permit the steady current to again charge the condenser, in cyclic succession.

2. The method of generating oscillations with an electron discharge valve having a control grid and a condenser, which includes relatively steadily feeding current unidirectionally to the condenser, utilizing a resulting charge on the condenser to make the valve conductive to discharge the condenser, utilizing growing discharge to make the valve more conductive, and utilizing decaying discharge to apply a biasing potential to said control grid to make the valve non-conductive to permit the steady current to again charge the condenser, in cyclic succession.

3. The method of generating modulated oscillations modulated in accordance with a desired signal by means including an electron discharge valve and a condenser at a frequency dependent upon the rate of supply of a direct current and independent of resonance, which includes feeding unidirectionally the direct current to the condenser, utilizing the resulting charge on the condenser to make the valve conductive to discharge the condenser, utilizing growing discharge to make the valve more conductive, utilizing decaying discharge to make the valve non-conductive to permit the direct current to again charge the condenser, in cyclic succession and varying the charging of the condenser in accordance with a desired signal.

4. The method of generating frequency modulated oscillations by means including an electron discharge valve and a condenser, and of controlling the frequency of the generated oscillations independently of resonance, which includes relatively steadily and unidirectionally feeding direct current to the condenser, utilizing the resulting charge on the condenser to make the valve conductive to discharge the condenser, utilizing growing discharge to make the valve more conductive, utilizing decaying discharge to make the valve non-conductive to permit the direct current to again charge the condenser, in cyclic succession, and adjusting the rate of supply of direct current to obtain the desired frequency of oscillation in accordance with the desired modulation.

5. The method of generating, by means including an electron discharge valve and a condenser, oscillatory energy the frequency of which is wobbled in accordance with a control current, which includes feeding direct current to the condenser, utilizing the resulting charge on the condenser to make the valve conductive to discharge the condenser, utilizing growing discharge to make the valve more conductive, utilizing decaying discharge to make the valve non-conductive to permit the direct current to again charge the condenser, in cyclic succession, and wobbling the magnitude of the direct current in accordance with the variations in the control current.

6. The method of generating, by means including an electron discharge valve and a condenser, oscillatory energy which is frequency modulated in accordance with control energy, which includes feeding direct current to the condenser, utilizing the resulting charge on the condenser to make the electron emission valve conductive to discharge the condenser, utilizing growing discharge to make the valve more conductive, utilizing decaying discharge to make the valve non-conductive to permit the direct current to again charge the condenser, in cyclic succession, varying the direct current in response to variations in the control energy, and limiting the resulting frequency modulated energy to eliminate energy variations.

7. The method of generating and radiating, by means including an electron discharge valve and a condenser, oscillatory energy which is frequency modulated in accordance with control energy, which includes feeding direct current to the condenser, utilizing the resulting charge on the condenser to make the electron emission valve conductive to discharge the condenser, utilizing growing discharge to make the valve more conductive, utilizing decaying discharge to make the valve non-conductive to permit the direct current to again charge the condenser, in cyclic succession, varying the direct current in response to variations in the control energy, limiting the resulting frequency modulated energy to eliminate energy variations, modulating high frequency carrier energy with the frequency modulated energy, and amplifying and radiating the resulting energy.

8. A non-resonant oscillation generator comprising a condenser, a regeneratively connected electron emission valve, which is non-conductive when the condenser is discharged and conductive when the condenser is charged, coupled to the condenser, a source of relatively steady condenser charging current connected to the coupled combination whereby charging of the condenser makes the valve conductive to discharge the condenser and discharge of the condenser makes the valve non-conductive to allow charging of the condenser in cyclic succession, and means for varying in predetermined fashion, the rate of charge of the condenser.

9. A non-resonant oscillation generator comprising an electron discharge valve having control electrode and anode circuits, means arranged in series with the valve for so coupling the circuits as to tend to make the valve conductive with growing electron discharge and non-conductive with decaying electron discharge, a condenser connected in parallel with the series combination of the valve and the coupling means, a source of relatively steady charging current connected to the parallel combination, so that condenser charge causes discharge which makes the valve more conductive and then non-conductive to permit the steady current to again charge the condenser, in cyclic succession, and means to control the magnitude of the steady charging current in order to control the frequency of the generated oscillations.

10. A non-resonant oscillation generator arranged for frequency modulation comprising an electron discharge valve having control electrode and anode circuits, means arranged in series with the valve for so coupling the circuits as to tend to make the valve conductive with growing electron discharge and non-conductive with decaying electron discharge, a condenser connected in parallel with the series combination of the valve and the coupling means, a source of relatively steady charging current connected to the parallel combination, so that condenser charge causes discharge which makes the valve more conductive and then non-conductive to permit the steady current to again charge the condenser, in cyclic succession, and means responsive to the modulating current for varying the charging current.

11. A non-resonant oscillation generator arranged for frequency modulation comprising an electron discharge valve having control electrode and anode circuits, means arranged in series with the valve for so coupling the circuits as to tend to make the valve conductive with growing electron discharge and non-conductive with decaying electron discharge, a condenser connected in parallel with the series combination of the valve and the coupling means, a source of relatively steady charging current connected to the parallel combination, so that condenser charge causes discharge which makes the valve more conductive and then non-conductive to permit the steady current to again charge the condenser, in cyclic succession, means responsive to the modulating current for modulating the charging current, and means to limit the generated oscillations to eliminate energy modulation.

12. A frequency modulation transmitter comprising an electron discharge valve having control electrode and anode circuits, means arranged in series with the valve for so coupling the circuits as to tend to make the valve conductive with growing electron discharge and non-conductive with decaying electron discharge, a condenser connected in parallel with the series combination of the valve and the coupling means, a source of relatively steady charging current connected to the parallel combination, so that condenser charge causes discharge which makes the valve more conductive and then non-conductive to permit the steady current to again charge the condenser, in cyclic succession, means responsive to the modulating current for modulating the charging current, means to limit the generated oscillations to eliminate energy modulation, a source of constant high frequency energy, a single side band modulator for modulating the high frequency energy with the frequency modulated energy, and means to amplify and radiate the resulting side band.

CLARENCE W. HANSELL.